Dec. 22, 1964   F. M. GLISSON   3,162,130
AIR CHARGER FOR WATER STORAGE TANKS
Filed Aug. 20, 1963   2 Sheets-Sheet 1
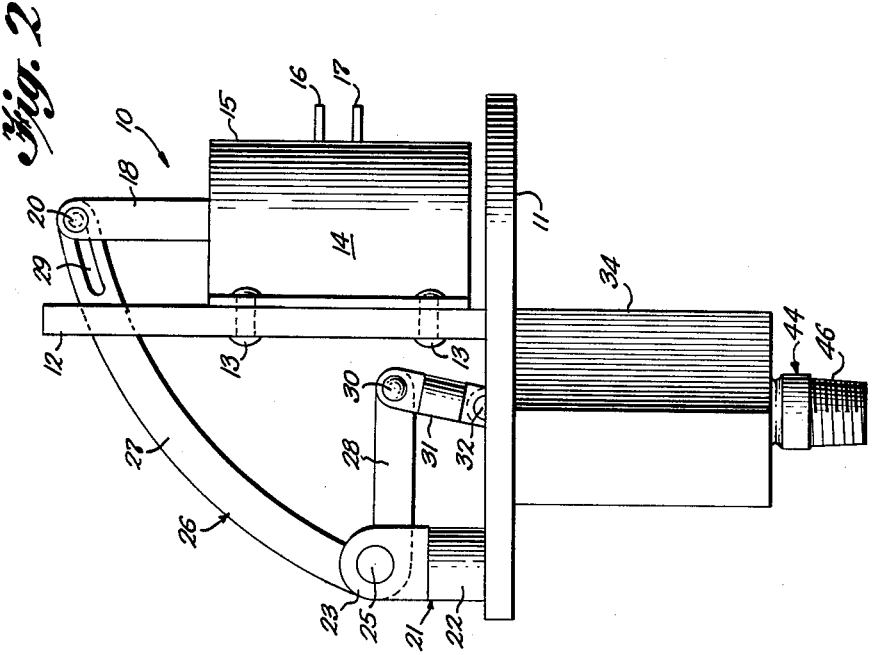
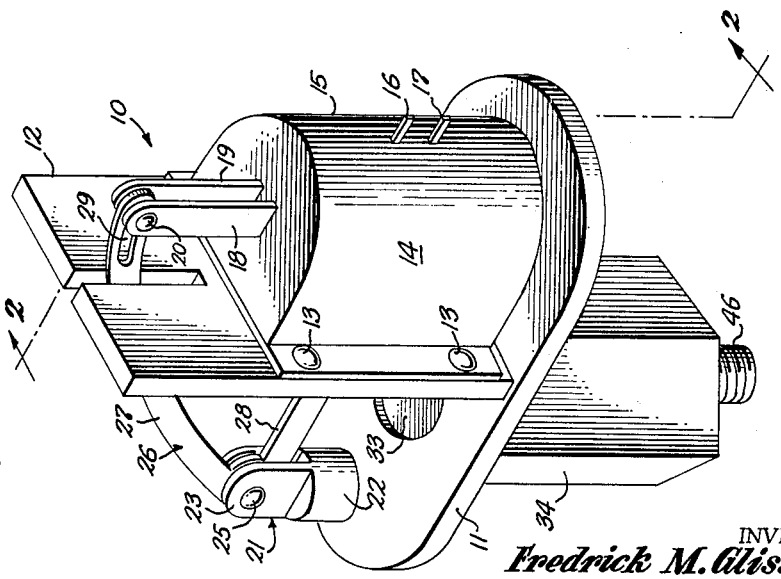
INVENTOR
Fredrick M. Glisson
BY Mason, Fenwick & Lawrence
ATTORNEYS Dec. 22, 1964  F. M. GLISSON  3,162,130
AIR CHARGER FOR WATER STORAGE TANKS
Filed Aug. 20, 1963  2 Sheets-Sheet 2
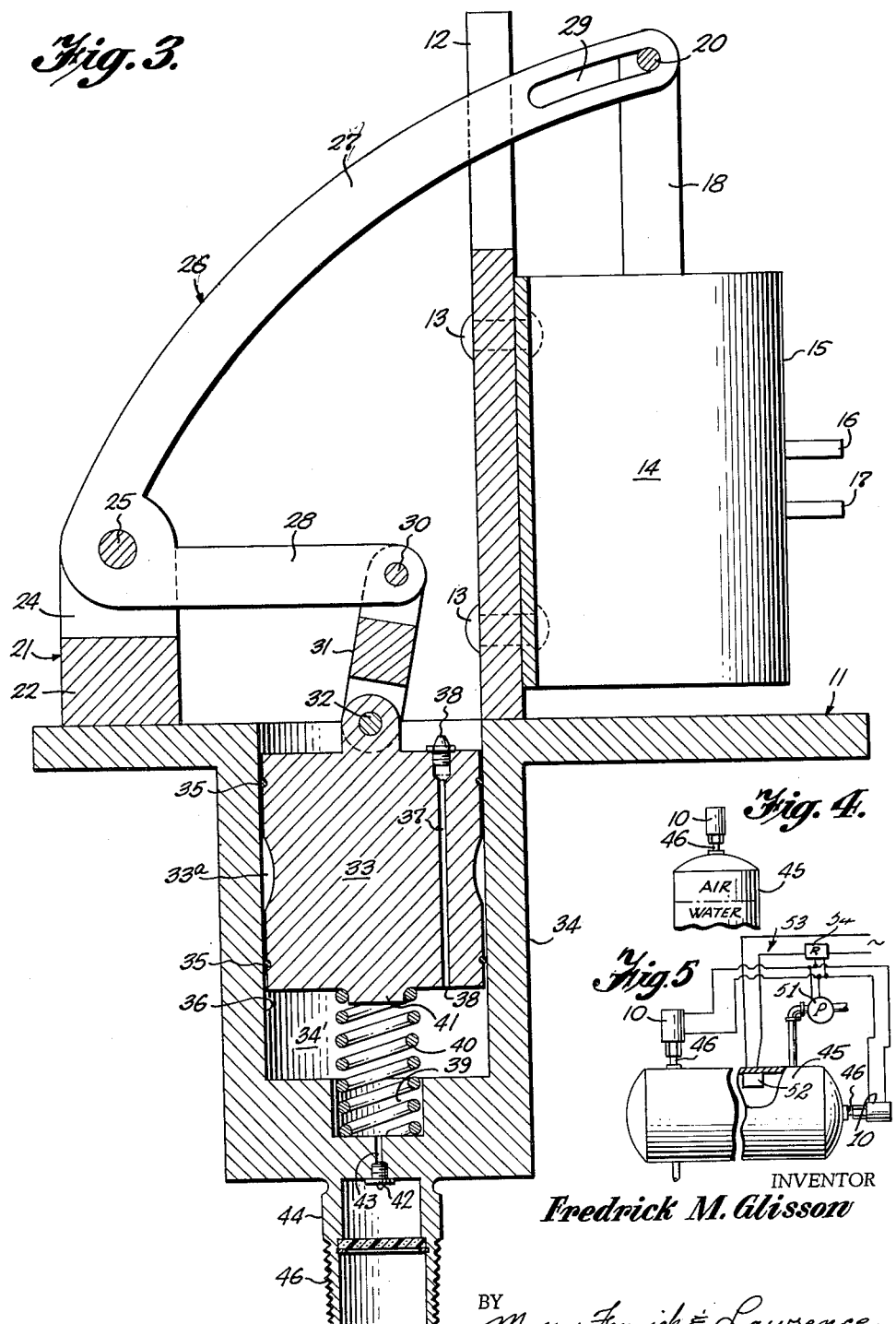
INVENTOR
Fredrick M. Glisson
BY
Mason, Fenwick & Lawrence
ATTORNEYS

United States Patent Office 3,162,130
Patented Dec. 22, 1964

3,162,130
AIR CHARGER FOR WATER STORAGE TANKS
Frederick M. Glisson, 1720 Jameston Drive,
Charlotte, N.C.
Filed Aug. 20, 1963, Ser. No. 303,337
5 Claims. (Cl. 103—6)

This invention relates to an automatic air volume control in water storage pressure tanks, and more particularly to a control that automatically charges a known volume of air into the water storage tank for maintaining both the required pressure and air volume within the upper portion of the tank.

It has been found that periodically the air within the water storage tank of a water supply system has to be replenished, as the pressurized air becomes entrained in the water within the turbulent zones of the tank and a certain amount of air leaves the tank whenever water is removed. In storage tanks of the type contemplated by this invention, it is a common rule of thumb that a maximum water volume of approximately one-half to two-thirds of the tank volume capacity should be maintained, with the remaining portion of the tank containing pressurized air to maintain a substantially constant head upon the storage tank water outlet. If the volume of air in the tank is permitted to dissipate without replenishment, the tank may become water-logged with the result that the water pump will become overheated and be subjected to possibility of failure when the pump is unable to force further amounts of water into the already water filled tank. Several devices in the prior art have been designed to limit both the water volume in the storage tank and also the pressure and volume of air in the upper portion of the tank.

One such prior art system employs a diaphragm type air charger wherein a diaphragm within a housing is flexed by water pressure when the water pump starts to operate, thereby moving the diaphragm which in turn causes a charge of air to be injected into the storage tank. Such a system as this has the disadvantages of having the working parts of the air charger in contact at all times with the water thereby subjecting it to corrosion with the resultant possibility of failure. A further disadvantage is that a known quantity of air is not injected into the pressure tank at every cycle of operation because of the variables inherent in the flexible diaphragm.

Another prior art air charger is designed with an air scoop and a venturi tube in the line between the pump outlet and the tank in order that when the pump functions and propels water through the venturi tube, air is drawn into the system by the moving water and carried to the tank. A system such as this has the obvious disadvantages of not being able to charge a known quantity of air each cycle, the capacity of the pump is decreased because of the extra load in moving the air, and the system would be subject to the corrosive effects of the water.

It is, therefore, an object of this invention to provide an improved solenoid operated air charger that injects a positive and known quantity of air into the water pressure tank for each pump cycle.

Another object of this invention is the provision of an air charger for water storage pressure tanks that is not subject to the corrosive effects of the water within the enclosed system.

Another object of this invention is the provision of an air charger for water storage pressure tanks that provides a constant positive air pressure upon the tank, prevents the tank from becoming water-logged and is adaptable to a wide range of sizes in both vertically and horizontally mounted tanks.

Other objects, advantages and capabilities of the invention will become apparent from the following description, taken in conjunction with the accompanying drawings showing only a preferred embodiment of the invention.

In the drawings:

FIGURE 1 is a perspective view of the present invention;

FIGURE 2 is a side elevation of the present invention;

FIGURE 3 is a view of the invention taken along lines 2—2 showing the air charger partially in section and partially in elevation;

FIGURE 4 is a schematic side elevation of the air charger mounted for operation upon a vertical type water tank;

FIGURE 5 is a schematic side elevation of the air charger mounted for operation upon a horizontal type water tank and an operable pumping system that may be used with the air charger.

Referring to the drawings, wherein like reference characters designate corresponding parts throughout the several figures, the improved air charger of the present invention is designated as an entirety by the reference numeral 10. The air charger unit 10 comprises a platform support member 11 upon which is mounted an upwardly standing solenoid support panel 12 having attached thereto, by rivets 13 or other suitable securing means, a solenoid 14 comprising a cover 15 including a base portion having exposed mounting flanges 15a through which the rivets 13 extend. Located within the cover 15 is a suitable solenoid unit (not shown) comprising the usual coil and reciprocative spring biased plunger for operating the device as set forth herein. Exposed terminals 16, 17 providing access to an electrical current supply for energizing the solenoid 14 protrude through the cover 15 and terminate externally of the cover. Extending upwardly through the cover 15 are a pair of spaced, flat parallel solenoid arms 18, 19 connected to the solenoid plunger (not shown) each having an aperture through the uppermost portion to receive the connector pin 20 therethrough.

Upon the opposite end of the platform 11 from the solenoid 14 is mounted bell-crank support 21 which has a base portion 22 and two spaced, flat parallel pivot support arms 23, 24 each having an aperture therethrough to receive the bell-crank pivot pin 25. Pivotally connected upon pivot pin 25 with the bell-crank support 21 is bell-crank lever 26 having a curved upper arm 27, and a lower arm 28 that normally extends parallel to the platform 11. An elongated slot 29 is provided in the upper end portion of upper arm 27 and extends along an arc corresponding substantially to the curvature of the upper arm 27. The upper arm 27 is positioned between the parallel solenoid arms 18, 19 to receive connector pin 20 passing through the aperture of each solenoid arm 18, 19 to effect a coupling that allows relative movement between upper arm 27 and solenoid arms 18, 19 along the arcuate path of arm 27 when the solenoid 14 is energized. The lower arm 28 of the bell-crank 26 is hingedly connected by pin 30 to piston rod 31 which in turn transmits movement of bell-crank arm 26 by way of the pin 32 hingedly connecting piston rod 31 to the piston 33.

The piston 33 as seen in FIGURE 3, is adapted to move longitudinally, of cylinder 34 depending from platform 11 and has a plurality of piston compression rings or O rings 35 for permitting sliding movement of the piston 33 within the cylinder 34 while preventing leakage of air between the piston 33 and cylinder wall 36. An arcuate cut 33a made about the periphery of piston 33 provides a space for lubricant in order that the cylinder wall 36 may be kept lubricated to prevent scoring due to heat developed during operation between the piston 33 and the cylinder wall 36. Located in the piston 33 is an air inlet opening 37 having a check valve 38 at the uppermost end thereof that admits air to chamber 34' when the piston 33 is moving through its upward stroke.

In the bottom of the chamber 34' is a circular spring well 39 in which a compressive spring 40 is seated. The upper end of spring 40 opposite from spring well 39 has one or more turns encircling a spring seat 41 that comprises a projecting cylindrical boss extending downwardly from the bottom of the piston 33, whereby a constant upward compressive force is maintained against the bottom of the piston 33. Further, spring seat 41 prevents any lateral shifting of spring 40 upon movement of the piston 33.

Air outlet valve 42, at the bottom of spring well 39, is provided in air outlet passageway 43 communicating with chamber 34' and provides an escape path for the air in chamber 34' upon downward movement of piston 33, whereby a charge of air is forced through the tank connection nipple 44 which joins the air charger of the instant invention to a suitable air pressure tank 45 by screw threads 46.

The instant invention is particularly designed to be used upon conventional water storage tanks in the capacity range of from 6 to 82 gallons, although it is contemplated, as shown in FIGURE 5, that the invention may be used upon larger tanks by installing multiple air chargers to inject a greater volume of air into the tank during each cycle of operation. With the usual 6 to 82 gallon tank size it has been found that a total volume of injected air of 1¼ cubic inches is adequate to maintain a proper volume of air within the tank. With larger tanks where greater volumes of injected air are needed, large size chargers or multiple air chargers of the above specified size may be used. In the vast majority of water storage systems, the water supply pump 51 is controlled by a pressure switch 52 located within the water tank that operates in response to air pressure in the upper part of the tank to turn the pump on when the pressure in the tank falls below 20 p.s.i. and turn the pump off when the pressure reaches 40 p.s.i. In relation to the present invention, it is seen that when the air pressure switch 52 in the storage tank 45 signals that the cut on pressure of 20 p.s.i. has been reached, the pump is automatically energized through electrical circuit 53 and by the closing of relay 54 and begins pumping water to the storage tank. The solenoid 14 should be connected with the pump energizing circuit 53 so that the solenoid 14 will be concurrently energized through terminals 16, 17 and will exert a downward force upon the solenoid plunger in known manner, which in turn move solenoid arms 18, 19 downwardly to apply a corresponding downward movement to upper bell-crank arm 27. Being pivoted about bell-crank pivot pin 25, the upper bell-crank arm 27 moves in an arc causing connector pin 20 to move within slot 29 as the solenoid arms 18, 19 are moved in a downward direction. As upper bell-crank arm 27 begins to pivot about bell-crank pivot pin 25, lower bell-crank arm 28 exerts a downward pressure through pin 30 to piston rod 31 which in turn will exert a force upon piston 33 which will move it through its required stroke, compressing spring 40 into well 39 thereby discharging the 1¼ cubic inch charge of air contained within cylinder chamber 34' through air outlet passage 43 and outlet valve 42. During operation of the pump, the solenoid 14 remains energized with the result that the piston 33 remains in its down position until the pump cut-off pressure of 40 p.s.i. is reached.

After the pressure switch 52 has signaled that the pressure in tank 45 has reached 40 p.s.i., the water pump 51 is automatically cut off and the solenoid 14 is de-energized which releases the attractive force upon the solenoid plunger. The spring 40 which has been held under compression by the action of solenoid 14 is now free to expand upwardly against piston 33, which in turn will cause all the elements of the system to return to their original starting positions. Upon the movement of piston 33 upwardly, a vacuum is created in chamber 34 because outlet valve 42 closed after all the air was expelled from the chamber 34 at the completion of the charging cycle. Because of the vacuum being created in chamber 34, the check valve 38 opens to admit another charge of air to fill the chamber 34 and upon the completion of the upward stroke of piston 33, valve 38 closes.

In the present invention it will be apparent that there will never be any detrimental overcharging of the storage tank due to an abnormally high number of pump operating cycles, because if more air is injected into the tank than is needed to balance the air loss therein, the volume of air will become greater within the tank causing more air to be entrained in the cold water than usual. Therefore, the tank self-regulates itself with respect to the volume and pressure of air therein by disposing of any excess through its normal cycling procedure. It is also contemplated that the tank will have a standard safety relief valve that will relieve the pressure in the tank if it should reach 120 p.s.i.

From the foregoing description it will be seen that the present invention provides an improvement in air charging systems wherein a positive and known quantity of air is injected into a pressure tank each time the water pump is turned on and wherein the air charger is not in contact with any water flow thereby eliminating the possibility of corrosion. Therefore, while I have particularly shown and described one particular embodiment of the invention, it is distinctly understood that the invention is not limited thereto but that modifications may be made within the scope of the invention and such variations as are covered by the scope of the appended claims.

What is claimed is:

1. Control apparatus for supplying air to an air chamber over a predetermined level of water in a water storage tank having pressure sensitive switch means responsive to a selected minimum air pressure in the tank signifying selected minimum water level conditions to complete a supply circuit initiating operation of a water pump to supply additional water to the tank, the control apparatus comprising a cylinder for periodically supplying a selected volume of air to said tank, conduit means at one end of the cylinder for delivering air from the cylinder to the upper portion of the tank, a reciprocative piston in said cylinder defining a compression chamber between said piston and one end of said cylinder movable axially thereof through a uniform advance stroke toward said one end for discharging the selected volume of air through said conduit means to said tank, means for admitting ambient air to said compression chamber during each return stroke of said piston away from said one end, a solenoid having a reciprocative plunger mechanically intercoupled with said piston to move the piston through its advance stroke upon energization of the solenoid, and means for connecting said solenoid with said supply circuit to energize said solenoid and drive said piston through its advance stroke each time the supply circuit is completed to initiate operating of the water pump.

2. In a water supply system, a water storage tank, a water pump for supplying water to said tank, an electrical supply circuit for operating the pump, means for maintaining a predetermined level of water in the storage tank below the top thereof providing a zone of entrapped air over the water level including pressure sensitive switch means responsive to a selected minimum air pressure in the tank corresponding to a minimum water level to complete the supply circuit to the water pump for initiating an operating cycle thereof supplying additional water to the tank until a predetermined higher air pressure is attained, means for periodically supplying a selected volume of air to the entrapped air zone of the tank each time the operating cycle of the pump is initiated comprising a cylinder having a reciprocative piston therein movable through an advance stroke of uniform length from a first position remote from one end of the cylinder to a second position adjacent said one end, the volume within said cylinder between said first and second positions of said piston defining a selected fixed volume of air for replenishment of air loss from said entrapped air zone through the water supply system, conduit means at said one end of the cylinder for delivering air from the cylinder to the upper portion of the tank during the advance stroke of the piston toward said one end, and means for admitting ambient air to said compression chamber during each return stroke of said piston away from said one end, a solenoid having a reciprocative plunger mechanically intercoupled with said piston to move the piston through its advance stroke upon energization of the solenoid, means for connecting said solenoid with said supply circuit to energize said solenoid and drive said piston through its advance stroke each time the supply circuit is completed to initiate operating of the water pump, and means for returning said piston to said first position when the pump ceases operating.

3. An automatic air volume control for injecting a charge of air of selected fixed volume into an entrapped air zone above the water level in a water storage tank concurrently with initiation of a cycle of operation of a water pump supplying water to said tank responsive to selected minimum air pressure conditions in the tank, comprising a platform support member having a cylinder depending therefrom adapted to be connected to the upper portion of a water storage tank, an air outlet passageway in one end of said cylinder for communication of air to said tank, a piston mounted for reciprocative movement within said cylinder and forming an air chamber between said piston and said one end, an air inlet passage extending through said piston and communicating ambient air with said air chamber during movement of the piston away from said one end, an electric solenoid mounted upon said platform support member adapted to be energized upon initiation of the cycle of operation of the water pump including a reciprocative plunger, and means interconnecting said plunger and said piston to move said piston toward said one end through a uniform stroke whenever said solenoid is energized whereby a measured charge of air of said selected volume is expelled from said chamber through said air outlet passageway into the water storage tank.

4. An automatic air volume control for injecting a charge of air of selected fixed volume into an entrapped air zone above the water level in a water storage tank concurrently with initiation of a cycle of operation of a water pump supplying water to said tank responsive to selected minimum air pressure conditions in the tank, comprising a platform support member having a cylinder depending therefrom and adapted to be connected to the upper portion of a water storage tank, an air outlet passageway in one end of said cylinder, a piston mounted for reciprocative movement through a stroke of fixed uniform length within said cylinder from a first position remote from said one end to a second position proximate to said one end and forming an air chamber having said selected volume between said positions, an air outlet check valve located in said outlet passageway to admit air flow through said outlet passageway during advance of the piston toward said one end, an air inlet passage extending through said piston for communicating ambient air with said air chamber, an air inlet check valve within said inlet passage for admitting ambient air to said chamber during return of said piston to said first position, solenoid support means extending upwardly from said platform support member, an electric solenoid mounted upon said solenoid support means adapted to be energized upon initiation of the cycle of operation of the water pump including a reciprocative plunger, means interconnecting said plunger with said piston to transmit to said piston a downward force toward said one end at such time as said solenoid is energized whereby a measured charge of air of said selected volume is expelled from said air chamber through said air outlet passageway and said outlet check valve into the water storage tank whenever said solenoid is energized.

5. An automatic air volume control for injecting a charge of air of selected fixed volume into an entrapped air zone above the water level in a water storage tank concurrently with initiation of a cycle of operation of a water pump supplying water to said tank responsive to selected minimum air pressure conditions in the tank, comprising a platform support member having a cylinder depending therefrom and adapted to be connected to the upper portion of a water storage tank, an air outlet passageway in one end of said cylinder, a piston mounted for reciprocative movement through a stroke of fixed uniform length within said cylinder from a first position remote from said one end to a second position proximate to said one end and forming an air chamber having said selected volume between said positions, an air outlet check valve located in said outlet passageway to admit air flow through said outlet passageway during advance of the piston toward said one end, a spring well in said cylinder at said one end and a compression spring seated in said well and bearing against said piston providing a biasing force to return said piston from said second position to said first position, an air inlet passage extending through said piston for communicating ambient air with said air chamber, an air inlet check valve within said inlet passage for admitting ambient air to said chamber during return of said piston to said first position, solenoid support means extending upwardly from said platform support member, an electric solenoid mounted upon said solenoid support means adapted to be energized upon initiation of the cycle of operation of the water pump including a reciprocative plunger terminating in a pair of upwardly extending arms, a piston rod pivotally connected to said piston, a bell crank lever having a pair of angularly related arms pivotally supported adjacent the junction of said arms to said platform support member and means pivotally connecting one arm of said bell crank lever to said arms of said solenoid plunger and the other arm of said bell crank lever to said piston rod to transmit to said piston a downward force toward said one end at such time as said solenoid is energized whereby a measured charge of air of said selected volume is expelled from said air chamber through said air outlet passageway and said outlet check valve into the water storage tank whenever said solenoid is energized.

References Cited by the Examiner

FOREIGN PATENTS 1,260,710   4/61   France.
1,133,247   7/62   Germany.
  885,873  12/61   Great Britain.

LAURENCE V. EFNER, *Primary Examiner.*